(12) United States Patent
Briggs et al.

(10) Patent No.: US 11,046,048 B1
(45) Date of Patent: Jun. 29, 2021

(54) SELECTIVE MODIFIERS FOR COMPOSITE MATERIAL PROPERTY ENHANCEMENT

(71) Applicant: National Technology & Engineering Solutions of Sandia, LLC, Albuquerque, NM (US)

(72) Inventors: Timothy Briggs, Brentwood, CA (US); Brian T. Werner, Livermore, CA (US); Joseph Carlson, Castro Valley, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/065,061

(22) Filed: Oct. 7, 2020

(51) Int. Cl.
*B32B 7/05* (2019.01)
*B32B 27/30* (2006.01)
*B32B 27/36* (2006.01)

(52) U.S. Cl.
CPC .............. *B32B 7/05* (2019.01); *B32B 27/306* (2013.01); *B32B 27/36* (2013.01); *B32B 2307/558* (2013.01)

(58) Field of Classification Search
CPC ......... B32B 7/05; B32B 27/306; B32B 27/36; B32B 2307/558
USPC ....................................................... 428/198
See application file for complete search history.

(56) References Cited

U.S. PATENT DOCUMENTS

| | | | | |
|---|---|---|---|---|
| 5,891,541 A | * | 4/1999 | Wynne | D06H 5/00 428/57 |
| 6,265,333 B1 | * | 7/2001 | Dzenis | B32B 5/28 442/346 |
| 8,841,358 B2 | | 9/2014 | Heikkila et al. | |
| 2004/0132913 A1 | * | 7/2004 | Datta | C08L 53/00 525/326.1 |
| 2004/0245521 A1 | * | 12/2004 | Faris | B81C 1/00071 257/40 |
| 2014/0056643 A1 | * | 2/2014 | Kao | C04B 41/63 404/31 |
| 2019/0194462 A1 | | 6/2019 | Heikkila et al. | |

OTHER PUBLICATIONS

Furlotti, et al., "Numerical Assessment of Impact Behavior of Composite Laminates with Variable Interply Delamination Strength", Procedia Materials Science, vol. 3 (2014), pp. 1467-1472.

(Continued)

*Primary Examiner* — Betelhem Shewareged
(74) *Attorney, Agent, or Firm* — Medley, Behrens & Lewis, LLC

(57) ABSTRACT

A laminate comprising a first ply, a second ply, and a plurality of interfacial modifiers arranged between opposing faces of the first ply and the second ply. A chemical composition of an interfacial modifier of the plurality of interfacial modifiers can be selected based on a resulting bond strength between the interfacial modifier of the plurality of interfacial modifiers and at least one of the first ply or the second ply. The plurality of interfacial modifiers can be arranged in a pattern to selectively modify toughness of a portion of the laminate based on the bond strength of the interfacial modifier of the plurality of interfacial modifiers.

20 Claims, 8 Drawing Sheets

(56) References Cited

OTHER PUBLICATIONS

Yasaee, et al., "Mode I Interfacial Toughening Through Discontinuous Interleaves for Damage Suppression and Control", Composites: Part A, vol. 43, Issue 1, Jan. 2012, pp. 198-207.
Yasaee, et al., "Mode II Interfacial Toughening Through Discontinuous Interleaves for Damage Suppression and Control", Composites: Part A, vol. 43, Issue 1, Jan. 2012, pp. 121-128.
Zhang, et al., "Fabrication of Patterned Thermoplastic Microphases Between Composite Plies by Inkjet Printing", Journal of Composite Materials, vol. 49, Issue 15, Jun. 2015, pp. 1-10.

\* cited by examiner

SELECTIVE MODIFIERS FOR COMPOSITE MATERIAL PROPERTY ENHANCEMENT

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

A composite laminate is a multi-layer product, with layers alternating between plies of fibrous fabric and matrix material bonding the plies together. Conventionally, as the composite laminate is assembled characteristics of the composite laminate, such as crack growth resistance, are determined by the materials used. Controlling characteristics of the composite laminate is currently limited to changing the type of fabric or matrix material used and/or an orientation at which each ply layer is placed.

SUMMARY

The following is a brief summary of subject matter that is described in greater detail herein. This summary is not intended to be limiting as to the scope of the claims.

In an exemplary embodiment, provided is a laminate comprising a first ply, a second ply, and a plurality of interfacial modifiers arranged between opposing faces of the first ply and the second ply. A chemical composition of an interfacial modifier of the plurality of interfacial modifiers can be selected based on a resulting bond strength between the interfacial modifier of the plurality of interfacial modifiers and at least one of the first ply or the second ply. The plurality of interfacial modifiers can be arranged in a pattern to selectively modify toughness of a portion of the laminate based on the bond strength of the interfacial modifier of the plurality of interfacial modifiers.

In another aspect, the laminate comprises a first ply, a second ply and a plurality of interfacial modifiers arranged between opposing faces of the first ply and the second ply. A chemical composition of an interfacial modifier of the plurality of interfacial modifiers can comprise at least one of polyvinyl alcohol, polyvinyl butyral, or any thermoplastic or thermoset resins. The plurality of interfacial modifiers are arranged in a pattern to selectively modify toughness of a portion of the laminate based on bond strength resulting from the chemical composition selected between the interfacial modifier of the plurality of interfacial modifiers and at least one of the first ply or the second ply.

A method of forming a laminate includes a step of selecting a chemical composition for an interfacial modifier of a plurality of interfacial modifiers based on a resulting bond strength between the interfacial modifier of the plurality of interfacial modifiers and at least one of a first ply or a second ply of a laminate. The method further includes defining a pattern for placement of the plurality of interfacial modifiers between the first ply and the second ply. The pattern can be configured to selectively modify toughness of a portion of the laminate based on the bond strength of the interfacial modifier of the plurality of interfacial modifiers. The method further includes the step of placing the plurality of interfacial modifiers between opposing faces of the first ply and the second ply according to the pattern.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
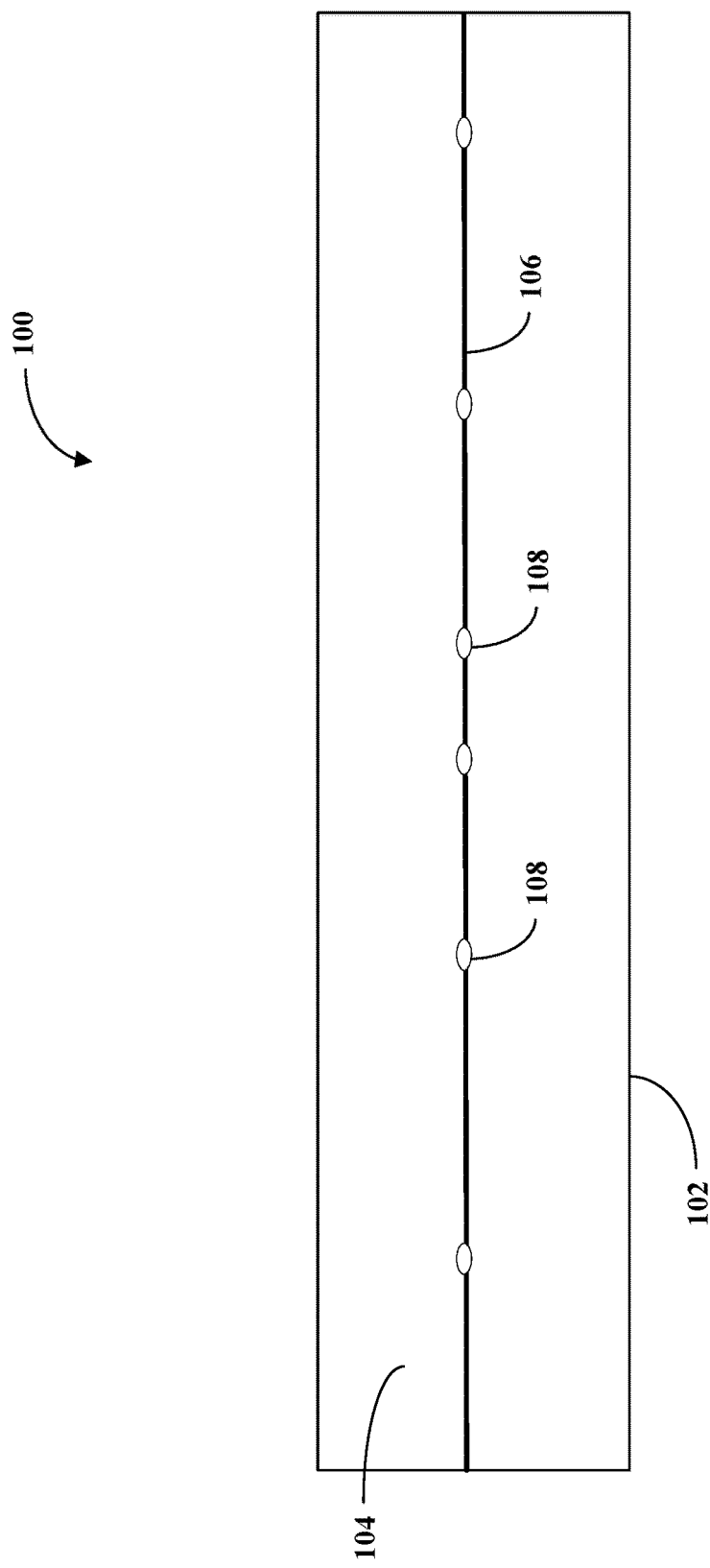
FIG. 1 illustrates an exemplary composite laminate.

Various technologies pertaining to a composite laminate are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is a modifier or plurality of modifiers used in a composite laminate to modify one or more qualities of the composite laminate. For instance, the modifier can be used to control interlaminar delamination resulting from lamination defects (e.g., cracks) introduced during manufacturing (e.g., stray release film, porosity, resin-starved regions, machining damage), intentional inclusions (e.g., embedded sensors such as strain gages, thermocouples, fiber optics, accelerometers, etc.), and/or by routine handling issues (e.g., mechanical shock, temperature/humidity exposure, abrasion, tool drop). The modifier can increase crack growth resistance of the composite laminate, as will be described in detail below. The modifier may be placed in any suitable position within the composite laminate. In the following embodiments, the modifier comprises an interfacial modifier that is placed in an interface between two plies. A chemical composition of the interfacial modifier can be selected based on the quality of the composite laminate being modified.

A composite laminate can be considered as a multilayer sandwich alternating between fibrous plies and layers of matrix material bonding the plies together. As the composite laminate is manufactured, certain baseline characteristics are set based on the material used, such as a toughness. Toughness is the ability of the composite laminate to resist the growth of cracks. Toughness of the composite laminate can be based on the ply material used, matrix material used, number of plies, orientation of each ply layer, and/or the like. Conventionally, composite laminates are designed in the through-thickness direction. The sequence different plies are stacked in is used to control properties of the composite laminate. For instance, the plies may be oriented in a specific direction to increase strength of the composite laminate in that direction.

Damage to the composite laminate can lead to toughening. Delamination is a mode of damage/failure in composite laminates. It is commonly caused by lamination defects (e.g., cracks) introduced during manufacturing (e.g., stray release film, porosity, resin-starved regions, machining damage) and/or by routine handling issues (e.g., mechanical shock, temperature/humidity exposure, abrasion, tool drop). As the lamination defect propagates through the composite laminate, it can cause portions of the laminate to separate.

Interlaminar delamination occurs when a crack grows along an interface between two adjacent plies of the composite. This is compared to intralaminar fracture which occurs when a crack grows within a ply or multiple plies of the composite. Damage to the composite laminate (e.g., a crack) leads to toughening. Crack extension occurs when energy dissipated during fracture per unit of newly created fracture surface area equals or exceeds a material's resistance to crack extension, a.k.a. the material's toughness. A plot of the material's toughness compared with crack length is called a crack resistance curve, or R-curve. The subject matter described herein can be used to control in-plane properties of interfaces between plies to increase crack growth resistance of the composite laminate as the crack grows.

More specifically, through strategic insertion of interfacial modifiers, the composite laminate can be designed to increase in toughness, or resistance to crack growth, as the defect grows. These interfacial modifiers may spread the damage at the crack tip through the composite laminate such that in order for a single macroscopic defect to grow, multiple microscopic defects must grow. By increasing the amount cracks that are simultaneously propagating the disclosed pattern of interfacial modifiers can result in a steeper R-curve of the composite laminate for each unit of crack growth (i.e., the composite laminate becomes tougher quicker) than a resulting R-curve for a single crack propagating in a single interface of the same composite laminate.

The interfacial modifiers may be placed in a pattern that is configured to leverage intrinsic toughness, which is the amount of energy necessary to separate multiple interfaces in the composite laminate. The interfacial modifier can have a toughness that is different from the toughness of the matrix material that is used in the interface, as will be described in detail below. For instance, the interfacial modifier can have a toughness higher than the toughness of the matrix material.

By selectively toughening a portion of a first interface, via an inserted interfacial modifier, as compared to a parallel portion of a second interface, the interfacial modifier may force the crack to form a new crack in the second interface, i.e. jump from the first interface to the second interface.

By forcing the crack to jump from one interface to another interface to continue propagation an intrinsic toughness of the composite laminate can be leveraged to steepen the R-curve of the composite laminate. As the cracks in the different interfaces propagate, the amount of energy dissipated increases exponentially with each new crack. For instance, where two cracks are formed, for each unit of overall crack extension the energy dissipated is twofold. In another instance, where ten cracks are formed, for each unit of overall crack extension the energy dissipated is tenfold. Thus, by increasing the amount of cracks that are simultaneously propagating, the disclosed pattern of interfacial modifiers can cause the R-curve of the composite laminate to steepen quicker than for a single crack propagating in a single interface.

Turning to FIG. 1, illustrated is one embodiment of a composite laminate 100. The composite laminate 100 comprises a plurality of plies that are stacked on top of each other that are then bonded to one another to form a single unit. In one embodiment, illustrated in FIG. 1, the composite laminate 100 comprises a first ply 102 and a second ply 104 that are bonded together one on top of the other. Although the illustrated composite laminate 100 includes two plies, any suitable number of plies may be employed, e.g., five plies, one hundred plies, etc. Each ply is made of a suitable material, such as high-modulus and/or high-strength fibers. The fiber can include cellulose, graphite, glass, boron, silicon carbide, and/or the like. A plurality of fibers may be woven together to form the ply and/or a plurality of non-woven fibers may be used to form the ply. The same material(s) may be used for each ply of the laminate or different material may be used.

The plies can then be bound together by curing a matrix material between each ply. The matrix material may be polymeric, metallic, and/or ceramic. For instance, the matrix material can include epoxies, polyimides, aluminum, titanium, alumina, and/or the like. The same matrix material may be used throughout the composite laminate 100 and/or different matrix materials can be used in different layers of the composite laminate 100.

The composite laminate 100 further includes a plurality of interfacial modifiers arranged in a pattern. For instance, illustrated in FIG. 1, a plurality of interfacial modifiers 108 can be placed in an interface 106 between opposing faces of the first ply 102 and the second ply 104. Each interfacial modifier of the plurality of interfacial modifiers 108 can have any suitable chemical composition. The chemical composition for each interfacial modifier in the plurality of interfacial modifiers 108 may be the same, may be similar, and/or may vary, as will be described in detail below. Moreover, where the composite laminate 100 comprises multiple layers each interface may have a plurality of interfacial modifiers that may be the same, may be similar and/or may vary.

The chemical composition of the plurality of interfacial modifiers 108 may be selected based on a desired trait for the composite laminate 100. For instance, a first chemical composition may be selected when a first toughness is desired, while a second chemical composition may be selected when a second toughness lower than the first toughness is desired. The chemical composition may comprise one or more chemical components in any suitable percent. Various examples of selecting the chemical composition will now be presented, the following examples relate to selecting a chemical composition for one interfacial modifier of the plurality of interfacial modifiers 108 but can be applied to any suitable number of interfacial modifiers in the plurality of interfacial modifiers 108.

Turning to one example, chemical composition of the interfacial modifier may be selected based on a resulting strength of the composite laminate 100. More particularly, in one embodiment, the chemical composition may be selected based on a strength of the covalent bond formed between the interfacial modifier and the first ply 102 and/or the second ply 104. In another embodiment, the chemical composition may be selected based on an amount of energy dissipation of the resulting composite laminate 100. In the following embodiments, selection of the chemical composition is based on bond strength, however, the chemical composition may be selected based on any suitable trait (e.g., energy dissipation, molecular mobility, etc.).

As the composite laminate 100 is formed, the interfacial modifier is sandwiched between and bonded to opposing faces of the first ply 102 and the second ply 104. This bond strength can be used to selectively modify the interface 106 between the opposing faces of the first ply 102 and the second ply 104.

More particularly, the bond strength can be used to selectively toughen and/or weaken a portion of the composite laminate 100. This is achieved by selecting a chemical composition with a bond strength that is different from a bond strength of the matrix material used in the interface 106. The amount of toughening and/or weakening of the portion may be a function of the bond strength and/or can result from other traits of the chemical composition, as will be described below. For instance, a chemical composition with a higher bond strength than the bond strength of the matrix material can be used to selectively toughen the portion of the composite laminate 100. Whereas, a chemical composition with a lower bond strength than the bond strength of the matrix material can be used to selectively weaken the portion of the composite laminate 100.

Selectively modifying toughness of the portion of the composite laminate 100 can be used to control crack propagation within the composite laminate 100. For example, crack propagation can be steered toward a part of the composite laminate 100. In another example, crack propagation can be steered away from a part of the composite laminate 100. Controlling crack propagation can be used to increase useful lifetime of the composite laminate 100 and/or to drive crack propagation to a visible portion of the composite laminate 100 to warn a user before the matrix material fractures and the composite laminate 100 critically cracks. More particularly, because a chemical composition with a lower bond strength than that of the base matrix material will crack at a lower stress than the base matrix material, this chemical composition can be used to inform a user of an achieved threshold stress prior to the base matrix material fracturing.

Turning to another example, in addition to, or in lieu of, controlling crack propagation, a chemical composition can be selected to control other propagations in the composite laminate 100. For instance, the chemical composition can be selected to control how electrical current flows through the composite laminate 100. More particularly, the chemical composition of the interfacial modifier can have an electrical conductivity that is different from an electrical conductivity of the matrix material. In another instance, the chemical composition can be selected to control the transfer of thermal energy through the composite laminate 100, or create a difference in optical properties like reflectance, transmittance, absorptivity, etc. More specifically, the chemical composition of the interfacial modifier can have a higher transfer rate of thermal energy compared with matrix material. For example, the interfacial modifier can radiate heat at a different rate than the matrix material.

Turning to a further example, the chemical composition can be selected to have a particular coefficient of thermal expansion that is different from a coefficient of thermal expansion for the matrix material. For instance, the interfacial modifier can expand at a rate higher than the rate the matrix material expands. In another instance, the interfacial modifier can expand at a lower temperature than the temperature the matrix material expands at.

Turning to a yet further example, the chemical composition can be selected to have a particular elastic modulus or strength that is different from the elastic modulus and strength of the matrix material. In yet another example, the chemical composition can be selected to have a particular optical property(s) that is different from optical properties of the matrix material.

The chemical composition of the interfacial modifier can comprise any suitable component or mixture of components to achieve one or more of the above described examples. For instance, the chemical composition can comprise polyvinyl alcohol. In another embodiment, the chemical composition comprises polyvinyl acetate. In a further embodiment, the chemical composition comprises polyvinyl butyral resin. In a yet further embodiment, the chemical composition comprises polyvinyl amine copolymers. In a yet further embodiment, the chemical composition comprises a thermoplastic resin. In an even further embodiment, the chemical composition comprises a Teflon coated release film. In another embodiment, the chemical composition comprises an epoxy resin.

Some chemical compositions may have a property(s) other than bond strength that increases or decreases toughness of the composite laminate 100. For instance, a chemical composition may have a property that increases fracture resistance of the portion of the composite laminate 100 although the chemical composition has a lower bond strength than the matrix material. For example, polyvinyl butyral resin may have a bond strength that is lower than the bond strength of the matrix material, but may increase the toughness of the portion because of other properties (e.g., energy dissipation, molecular mobility, etc.).

In addition to mixing components to form the chemical composition, multiple chemical compositions may be stacked and/or arranged to form the interfacial modifier. For instance, a first chemical composition and a second chemical composition can be stacked on top of each other to form the interfacial modifier.

Moreover, the percentage of components within a mixture can be varied to achieve the desired results. For instance, polyvinyl butyral resin commonly comprises a mixture of polyvinyl butyral, polyvinyl acetate, and polyvinyl alcohol. Varying the percentages of the components in the polyvinyl butyral resin permits tuning of the polyvinyl butyral resin to achieve the desired trait for the composite laminate 100. In one embodiment, the polyvinyl butyral resin may comprise 20% polyvinyl acetate, 50% polyvinyl alcohol, and 30% polyvinyl butyral. In another embodiment, the chemical composition may comprise 9% by weight of polyvinyl alcohol and 88% hydrolyzed polyvinyl alcohol with 12% comprising polyvinyl acetate. In a further embodiment, the chemical composition may comprise 9% by weight of polyvinyl alcohol and 98% hydrolyzed polyvinyl alcohol with 2% comprising polyvinyl acetate.

In addition to selecting a chemical composition to tune a quality or qualities of the composite laminate 100, the plurality of interfacial modifiers 108 may be placed in the interface 106 in a pattern to heterogeneously tune the quality or qualities throughout the composite laminate 100. For instance, the plurality of interfacial modifiers 108 may have a chemical composition with a higher bond strength than the bond strength of the matrix material and may be arranged in a pattern to heterogeneously toughen portions of the composite laminate 100 to control crack propagation within the interface 106. In another example, the plurality of interfacial modifiers 108 may have a chemical composition with a lower bond strength than the bond strength of the matrix material and may be arranged in a pattern to heterogeneously weaken portions of the composite laminate 100 to control crack propagation within the interface 106.

In a further example, the plurality of interfacial modifiers 108 may have a chemical composition that radiates thermal energy at a lower temperature than the matrix material and are arranged in a pattern to inform a user that the composite laminate 100 is experiencing a threshold temperature that impacts integrity of the composite laminate 100. For instance, the plurality of interfacial modifiers 108 may be arranged to spell a message via radiative thermal energy visible outside the composite laminate 100 when the composite laminate 100 is exposed to a threshold temperature.

The pattern may be based on any number of factors, including the chemical composition of the plurality of interfacial modifiers 108, the ply material, the interfacial matrix material, external stresses that will be placed on the laminate composite 100 in the field, the number of plies, and/or the like. The following examples are made with reference to controlling crack propagation, but the following concepts can be applied to any quality or qualities modified via the plurality of interfacial modifiers 108. For instance, a first number of interfacial modifiers may be placed in an area of the composite laminate 100 subject to high interlaminar stresses in a thickness direction of the composite laminate 100, e.g., where the composite laminate 100 is subjected to bending, while a second number of interfacial modifiers may be placed in an area where the composite laminate 100 experiences lower interlaminar stresses, e.g., the composite laminate 100 is substantially planar, wherein the first number is greater than the second number.

The overall pattern of interfacial modifiers within the composite laminate 100 can be calculated based on any suitable method. For instance, a computer simulation may be used to predict crack propagation within a simulated composite laminate 100 based on different patterns to determine which pattern will result in the steepest R-curve. The computer simulation can be performed for different portions of the composite laminate 100 (e.g., one interface at a time, a segment of the entire thickness, etc.) or can be performed for the whole composite laminate 100.

Figure 2:
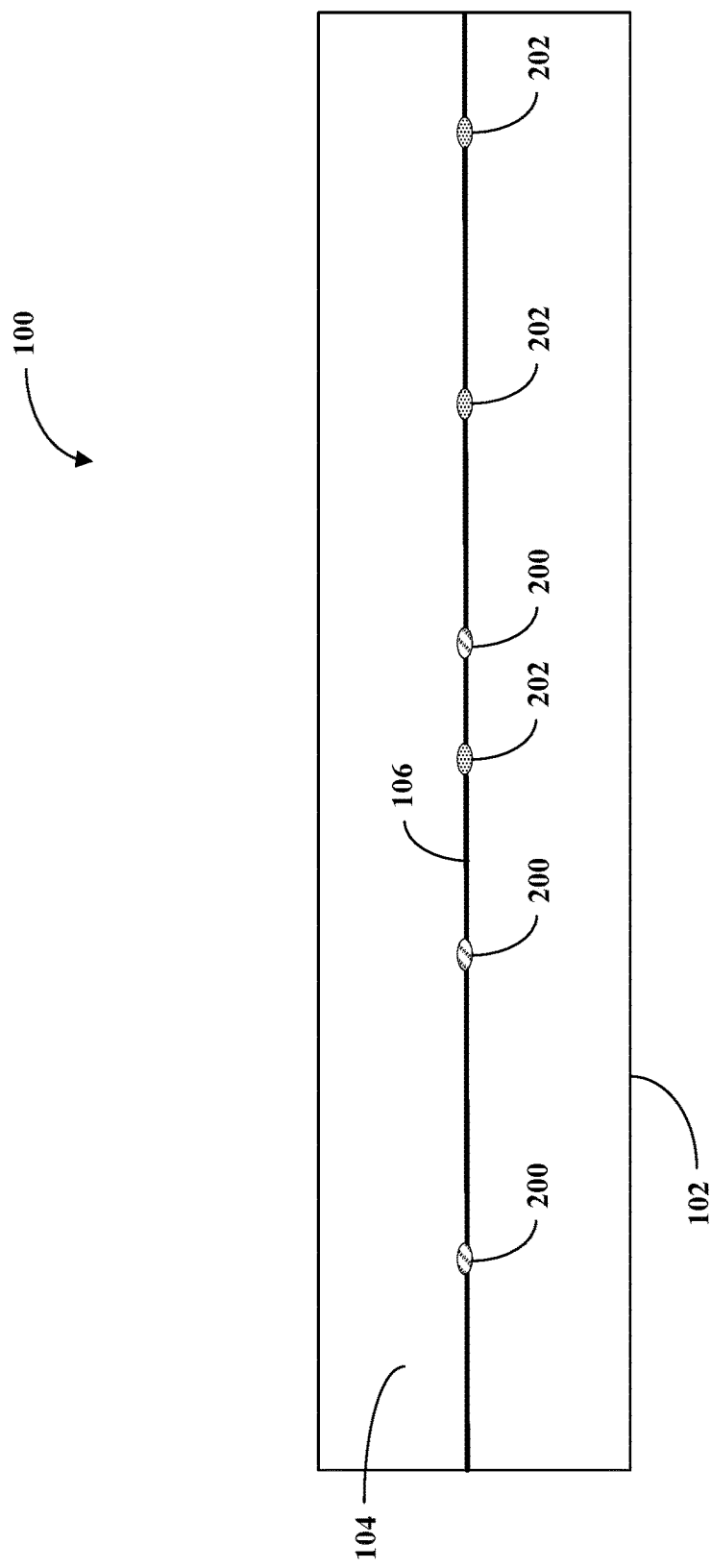
FIG. 2 illustrates another exemplary composite laminate.

As briefly mentioned above, the plurality of interfacial modifiers 108 can have a uniform chemical composition and/or the chemical composition may vary. For instance, illustrated in FIG. 2 is an embodiment where a plurality of interfacial modifiers in the interface 106 has different chemical compositions. The illustrated plurality of interfacial modifiers comprises first interfacial modifiers 200 made of a first chemical composition and second interfacial modifiers 202 made of a second chemical composition. Using different chemical compositions permits for multiple qualities to be modified via the plurality of interfacial modifiers. For example, the first chemical composition can be used to toughen portions of the composite laminate 100, while the second chemical composition can be used to modify electrical conductivity of other portions of the composite laminate 100. In another example, the composite laminate 100 can have various levels of toughening where the first chemical composition has a first bond strength higher than the bond strength of the matrix material and the second chemical composition has a second bond strength that is higher than the bond strength of the matrix material but lower than the first bond strength.

As described above, the illustrated plurality of interfacial modifiers can be arranged in any suitable pattern. Because the illustrated plurality of interfacial modifiers comprises a variety of chemical compositions, the pattern can be arranged to separate and localize the different chemical compositions, intersperse the different chemical compositions, and/or the like based on whichever pattern is suitable for the composite laminate 100.

Figure 3:
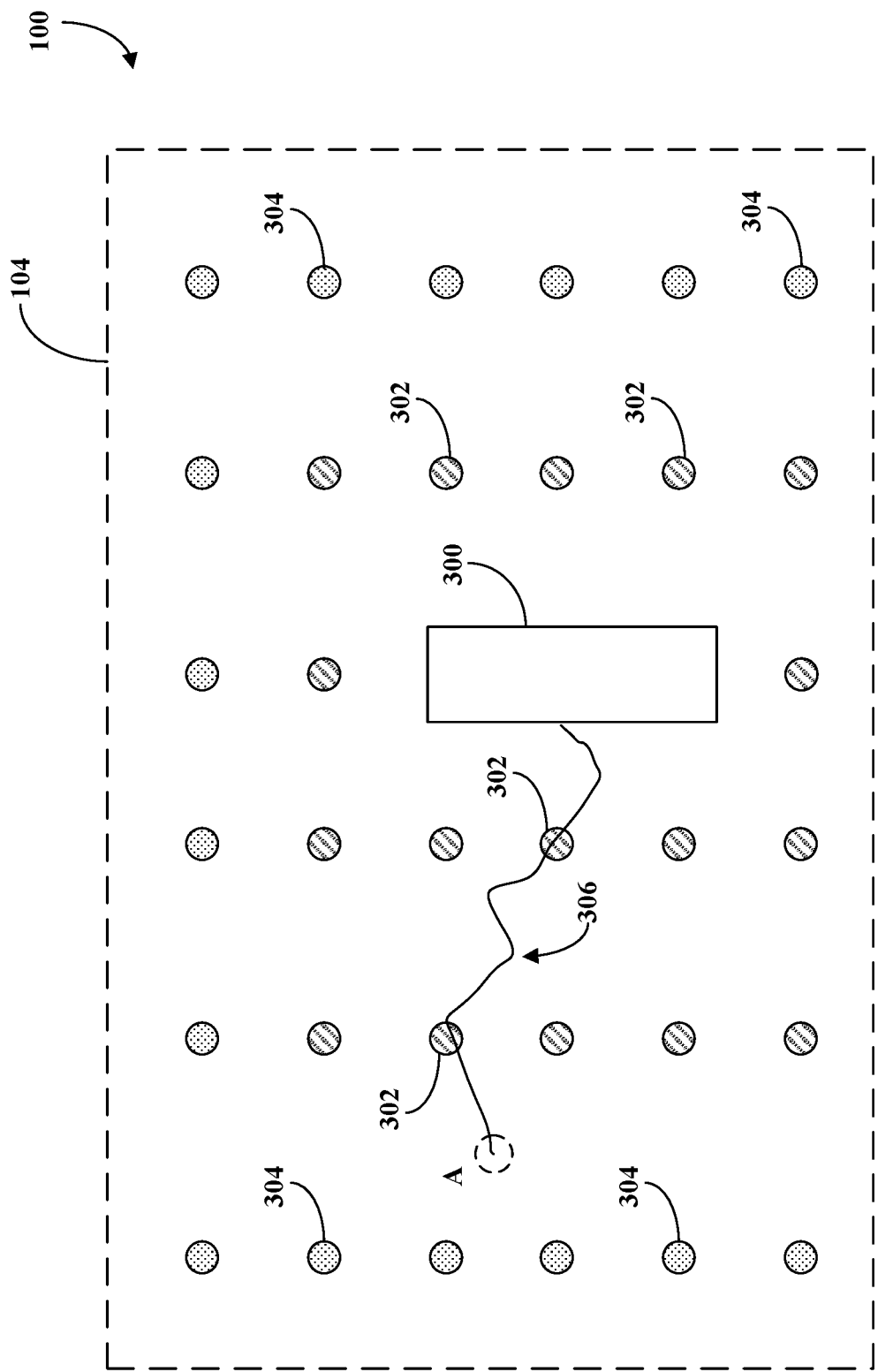
FIG. 3 illustrates yet another exemplary composite laminate.

As mentioned above, the use of a plurality of interfacial modifiers arranged in a pattern in the composite laminate 100 can be used to direct crack propagation toward and/or away from certain portions of the composite laminate 100. Illustrated in FIGS. 3 and 4 are exemplary embodiments of directing crack propagation toward a certain portion of the composite laminate 100 (FIG. 3) and directing crack propagation away from a certain portion of the composite laminate 100 (FIG. 4).

For instance, the composite laminate 100 may further include a structural monitoring sensor 300 that can be configured to output information indicative of an integrity of the composite laminate 100. The structural monitoring sensor 300 can be placed at any suitable location in the composite laminate 100 and in the illustrated embodiment is located in the interface 106 between the first ply 102 and the second ply 104. Because the structural monitoring sensor 300 can inform a user about the integrity of the composite laminate 100, it may be desirable to direct crack propagation if it exists in the structure, toward the structural monitoring sensor 300.

To this end, the composite laminate 100 includes a plurality of interfacial modifiers that selectively toughen and/or selectively weaken portions of the composite laminate 100. In the illustrated embodiment, the plurality of interfacial modifiers has a variety of chemical compositions, with interfacial modifiers 302 with a weaker bond strength chemical composition near the structural monitoring sensor 300 and interfacial modifiers 304 with a stronger bond strength chemical composition spaced away from the structural monitoring sensor 300. By placing the weaker bond strength interfacial modifiers 302 near the structural monitoring sensor 300, crack propagation can be directed toward the structural monitoring sensor 300 because less energy is required for the crack to propagate through the weaker bond strength interfacial modifiers 302 than through the stronger bond strength interfacial modifier 304 and will thus propagate through the weaker bond strength interfacial modifiers 302. This propagation can be seen by crack 306 that extends from an initiation point A toward the structural monitoring sensor 300, making detection of damage near a sensor more feasible with higher resolution.

Figure 4:
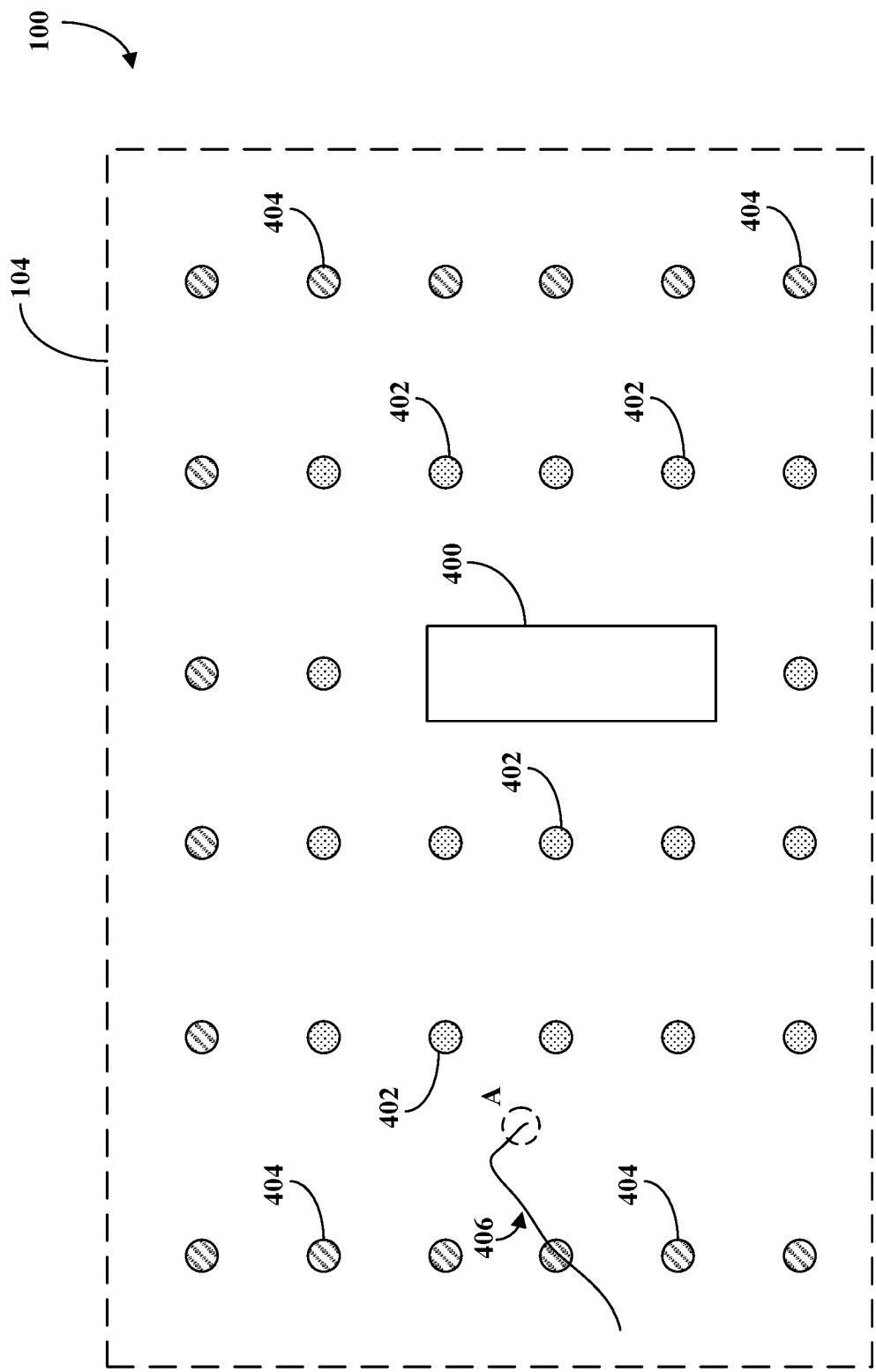
FIG. 4 illustrates a further exemplary composite laminate.

Turning to FIG. 4, in another embodiment, the composite laminate 100 may further include fiber optic sensor 400 and it may be desirable for crack propagation to be steered away from the fiber optic sensor 400. The fiber optic sensor 400 can be placed at any suitable location in the composite laminate 100 and in the illustrated embodiment is located in the interface 106 between the first ply 102 and the second ply 104.

To steer crack propagation away from fiber optic sensor 400, the composite laminate 100 includes a plurality of interfacial modifiers that selectively toughen and/or selectively weaken portions of the composite laminate 100. In the illustrated embodiment, the plurality of interfacial modifiers has a variety of chemical compositions, with interfacial modifiers 402 with a higher bond strength chemical composition near the fiber optic sensor 400 and interfacial modifiers 404 with a weaker bond strength chemical composition spaced away from the fiber optic sensor 400. By placing the stronger bond strength interfacial modifiers 402 near the fiber optic sensor 400, crack propagation can be directed away from the fiber optic sensor 400 because less energy is required for the crack to propagate through the weaker bond strength interfacial modifiers 404 than through the stronger bond strength interfacial modifier 402 and will thus propagate through the weaker bond strength interfacial modifiers 404. This propagation can be seen by crack 406 that extends from an initiation point A away from the fiber optic sensor 400.

Figure 5:
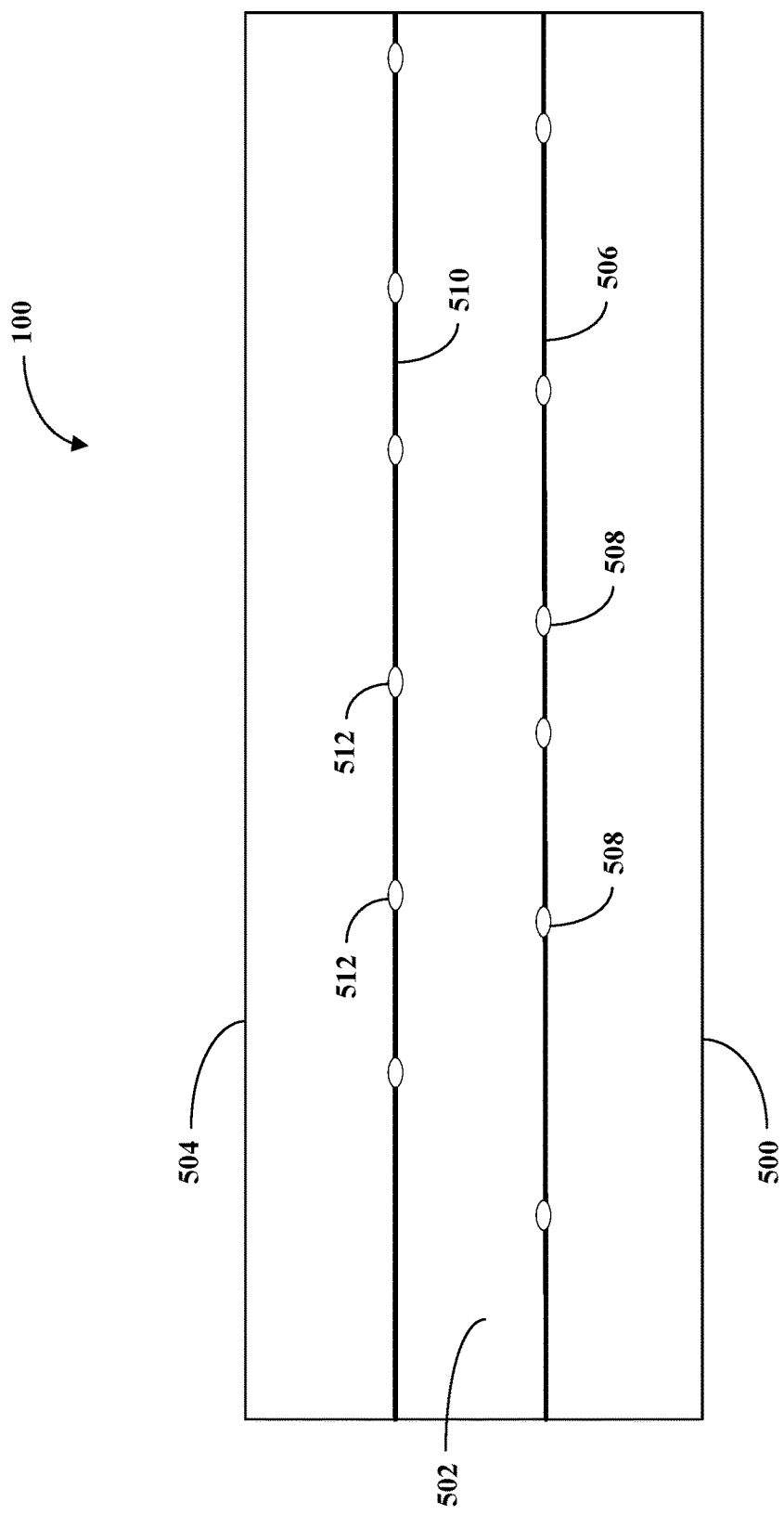
FIG. 5 illustrates a yet further exemplary composite laminate.

Turning now to FIG. 5, as mentioned above, the composite laminate 100 may comprise multiple plies stacked on one another with multiple interfaces between each one. Illustrated in FIG. 5 is one embodiment of the composite laminate 100 that includes a first ply 500, a second ply 502, and a third ply 504 that are bonded together one on top of the other. In the illustrated embodiment, the composite laminate 100 further includes a first plurality of interfacial modifiers 508 placed in an interface 506 between opposing faces of the first ply 500 and the second ply 502 and a second plurality of interfacial modifiers 512 placed in an interface 510 between opposing faces of the second ply 502 and the third ply 504.

As illustrated in FIG. 5, the first plurality of interfacial modifiers 508 can be arranged in a first pattern and the second plurality of interfacial modifiers 512 can be arranged in a second pattern. The first pattern and the second pattern can be different or can include portions that are substantially similar. For instance, the second pattern can be designed such that none of the interfacial modifiers in the second plurality of interfacial modifiers 512 overlap with interfacial modifiers of the first plurality of interfacial modifiers 508 in the final composite laminate 100 product. Each pattern may vary in density across their respective interface. For instance, where the first interface experiences a higher strain level than the second interface experiences for the same area, the density of interfacial modifiers may be higher in the first interface than the second interface The patterns may be configured to cause a crack propagating in one interface to jump to the other interface. For instance, the first pattern can be configured to cause a crack in the first interface 506 to jump to the second interface 510 when the crack reaches one of the first plurality of interfacial modifiers 508. As the crack propagates through the second interface 510, it may reach an interfacial modifier of the second plurality of interfacial modifiers 512 which could cause the crack to jump back down to the first interface 506. This jump down would result in three cracks propagating through the composite laminate 100, two separate cracks in the first interface 506 and one crack in the second interface 510. The first pattern and the second pattern can be configured to cause cracks to jump back and forth between the first interface 506 and the second interface 510 creating a multitude of cracks.

Figure 6:
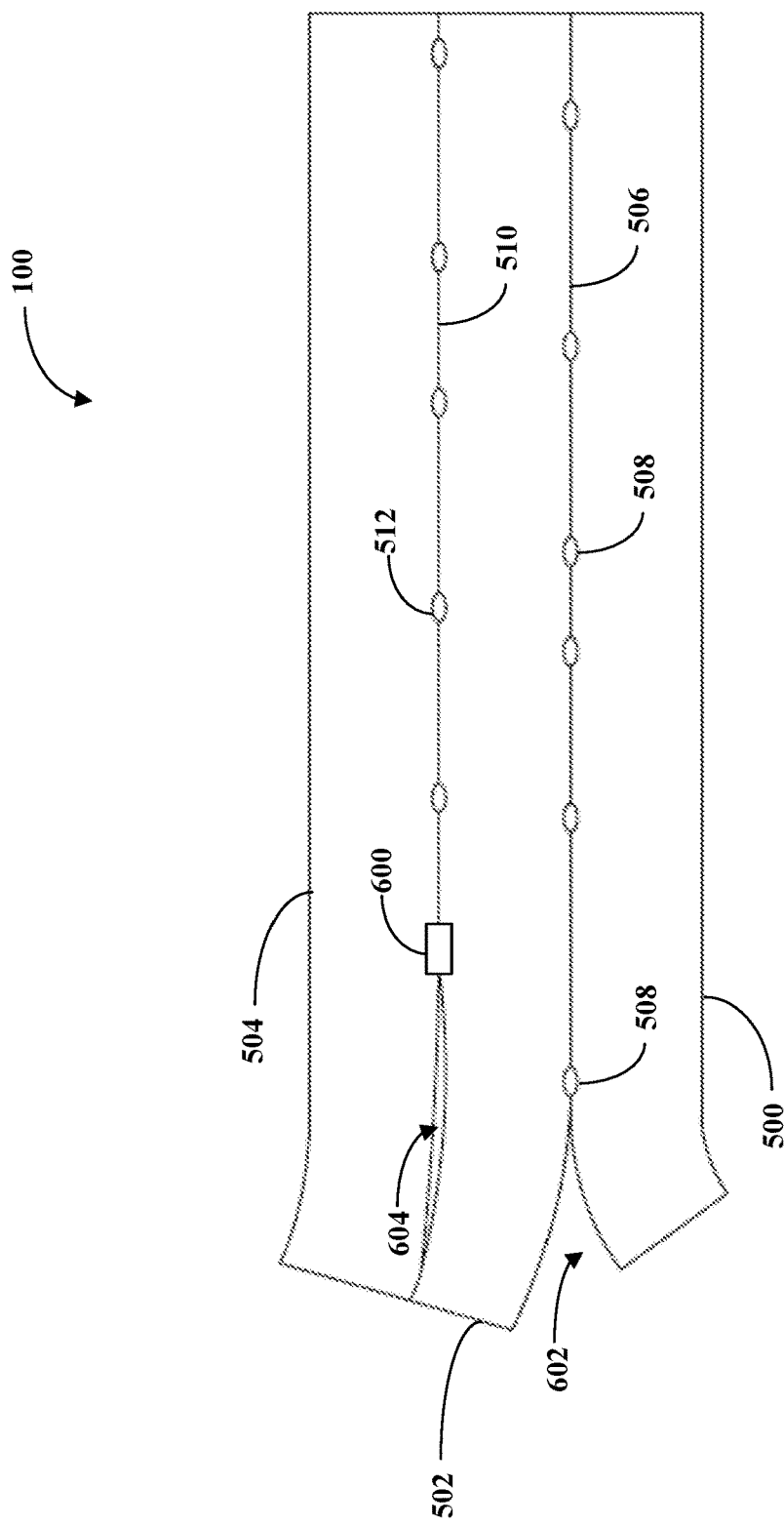
FIG. 6 illustrates another exemplary composite laminate.

In addition to causing the crack to jump between interfaces, the patterns can be configured to direct crack propagation toward a sensor. As seen in FIG. 6, the composite laminate 100 includes a sensor 600 located in the second interface 510. The first pattern can be configured to cause a crack 602 propagating in the first interface 506 to jump to the second interface 510. The crack 604 in the second interface 510 can then be directed toward the sensor 600. Any suitable method can be used to direct the crack 604 in the second interface 510 toward the sensor 600. For instance, an interfacial modifier in the first plurality of interfacial modifiers 508 can be located in the first interface 506 in an area below the sensor 600.

Any suitable method may be used for placing the interfacial modifiers in the interface. The method may depend on the chemical composition selected. For instance, a printer head can be used to selectively apply the plurality of interfacial modifiers to a surface of the first ply according to the predefined pattern. The chemical composition may be dissolved into a carrier solvent and deposited via an inkjet for CNC controlled placement.

Figure 7:
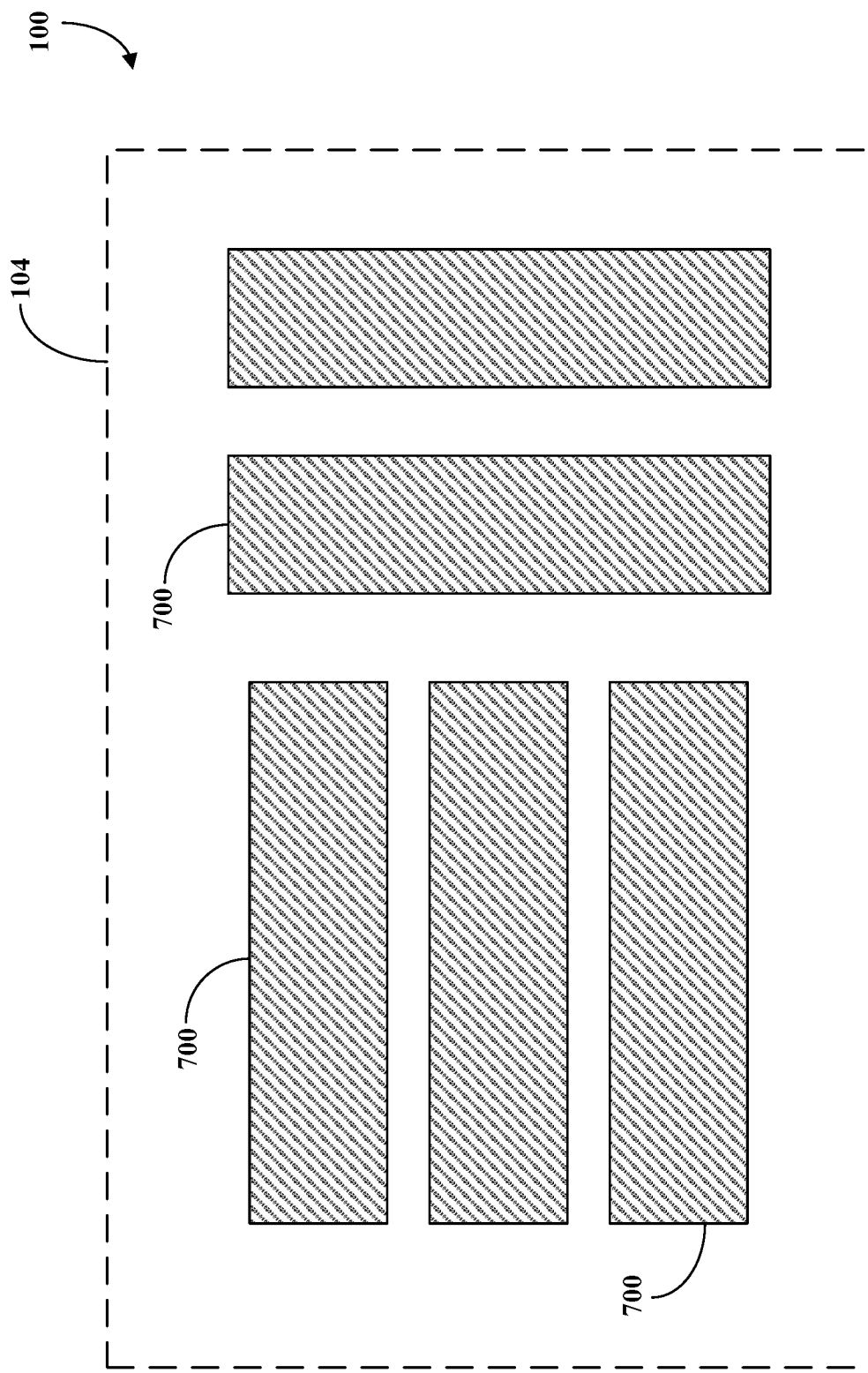
FIG. 7 illustrates a further exemplary composite laminate.

In another example, the plurality of interfacial modifiers can be manually deposited on the surface of the first ply according to the predefined pattern. In a further example, illustrated in FIG. 7, the interfacial modifiers 700 may be cut from a film according to a desired shape and/or shapes that can then be applied to the surface of the first ply. The film can be cut via any suitable method, such as cutting according to a pattern of holes formed in a stencil. The shapes can be uniform, as seen in FIG. 7, and/or can vary.

In any of the preceding examples, the second ply can then be aligned with this surface of the first ply and joined thereto to form the composite laminate 100. Where the composite laminate 100 comprises multiple ply layers with multiple interfaces each having their own plurality of interfacial modifiers, the same method can be used for each layer and/or the method can vary.

Figure 8:
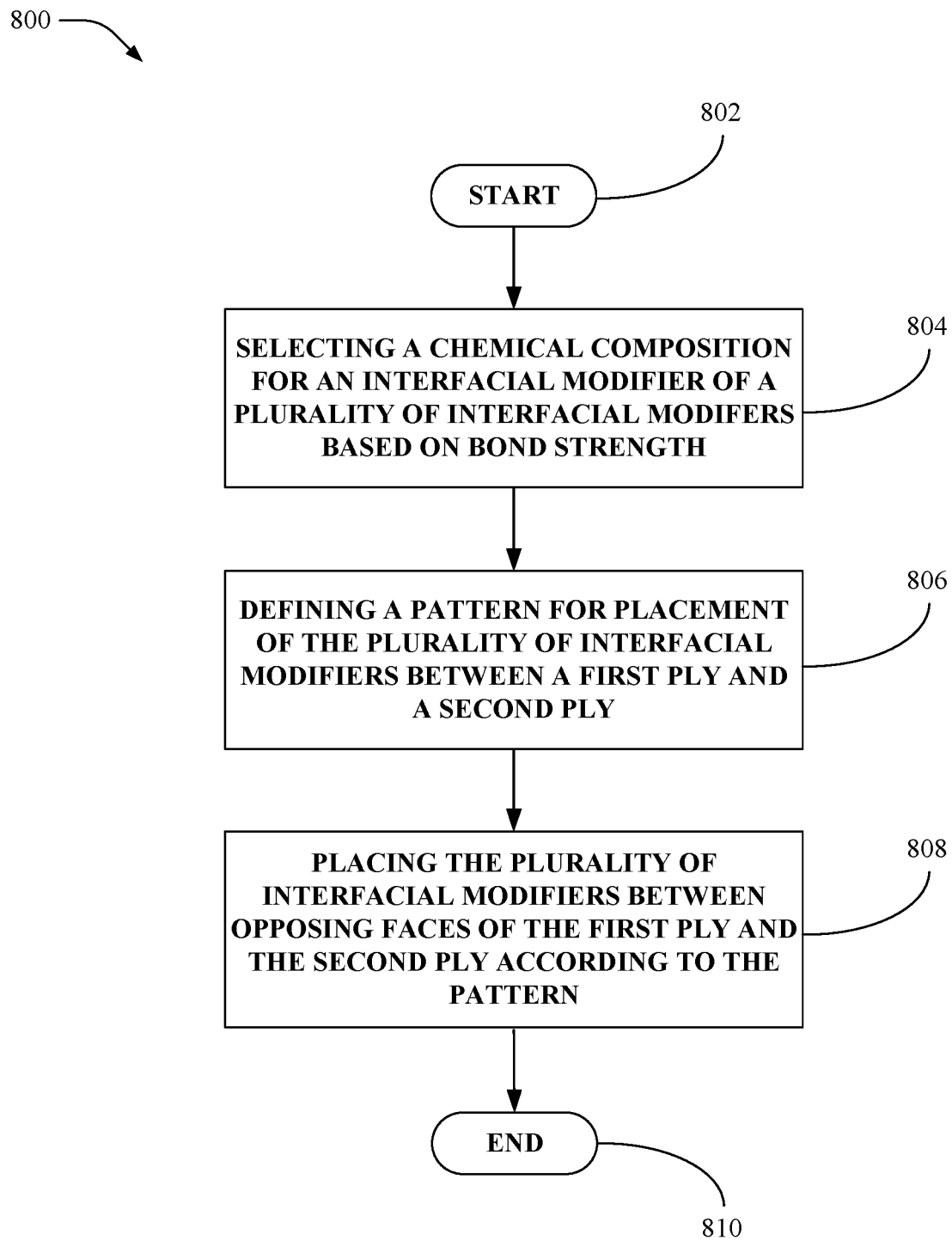
FIG. 8 is a flow diagram that illustrates an exemplary methodology for forming a composite laminate.

FIG. 8 illustrates an exemplary methodology relating to forming a composite laminate. While the methodology is shown as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Referring now to FIG. 8, an exemplary methodology 800 is illustrated. The methodology 800 starts at 802, and at 804, a chemical composition for an interfacial modifier of a plurality of interfacial modifiers is selected based on a resulting bond strength between the interfacial modifier of the plurality of interfacial modifiers and at least one of a first ply or a second ply of a laminate. At 806, a pattern is defined for placement of the plurality of interfacial modifiers between a first ply and a second ply. The pattern can be configured to selectively modify toughness of a portion of the laminate based on the bond strength of the interfacial modifier of the plurality of interfacial modifiers. At 808, the plurality of interfacial modifiers is placed between opposing faces of the first ply and the second ply according to the pattern. The methodology 800 concludes at 810.

In one embodiment of the methodology 800, the step of placing the plurality of interfacial modifiers comprises at least one of 3D printing, manual deposition, or placing cut films.

In another embodiment, the methodology 800 further includes selecting a second chemical composition for a second interfacial modifier of the plurality of interfacial modifiers based on at least one of response of the second chemical composition to changes in temperature, the second chemical composition's thermal energy transference, or the second chemical composition's electrical current conductivity.

In a further embodiment, the methodology 800 further includes selecting a chemical composition for an interfacial modifier of a second plurality of interfacial modifiers based on a bond strength between the interfacial modifier of the second plurality of interfacial modifiers and at least one of the second ply or a third ply of the laminate. The second ply interposes the first ply and the third ply. The methodology 800 further includes defining a second pattern for placement of the second plurality of interfacial modifiers between the second ply and the third ply. The second pattern is configured to selectively modify toughness of a second portion of the laminate based on the bond strength of the interfacial modifier of the second plurality of interfacial modifiers, wherein the second pattern is different from the pattern. The methodology 800 can yet further include placing the second plurality of interfacial modifiers between opposing faces of the second ply and the third ply according to the second pattern.

In a yet further embodiment, the chemical composition comprises at least one of polyvinyl alcohol, polyvinyl butyral resin, thermoplastic resin, or thermoset resin.

In addition to selectively steepening an R-curve of a composite laminate 100 and/or controlling crack propagation in the composite laminate 100, the described concept of strategically inserting modifiers between plies of a composite laminate 100 can be used to control other properties of the composite laminate 100. For instance, interfacial modifiers can be placed in a pattern that is configured to minimize the distance a projectile penetrates a composite laminate 100. In another example, interfacial modifiers can be placed in a pattern that is configured to minimize and/or control force transmitted across a composite laminate 100. The described concept can also be used to insert sensors into the composite laminate 100 to monitor different properties of the composite laminate 100 (e.g., stress experienced, presence of a defect, temperature, etc.) without causing delamination to propagate within the composite laminate 100

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A laminate comprising:
  a first ply;
  a second ply; and
  a plurality of interfacial modifiers arranged between opposing faces of the first ply and the second ply, wherein a chemical composition of an interfacial modifier of the plurality of interfacial modifiers is selected based on a resulting bond strength between the interfacial modifier of the plurality of interfacial modifiers and at least one of the first ply or the second ply,
  wherein the plurality of interfacial modifiers are arranged in a pattern to modify toughness of a portion of the laminate based on the bond strength of the interfacial modifier of the plurality of interfacial modifiers.

2. The laminate of claim 1, wherein the bond strength is above a threshold amount to increase crack growth resistance of the portion laminate by selectively toughening the portion of the laminate.

3. The laminate of claim 2, wherein the portion is located where the laminate is anticipated to experience a stress state above a threshold level.

4. The laminate of claim 1, wherein the bond strength is below a threshold amount to decrease crack growth resistance of the portion of the laminate by selectively weakening the portion of the laminate.

5. The laminate of claim 1, wherein the chemical composition comprises polyvinyl alcohol.

6. The laminate of claim 1, wherein the chemical composition comprises polyvinyl butyral resin.

7. The laminate of claim 1, wherein the chemical composition comprises at least one of:
  polyvinyl acetate;
  polyvinyl amine copolymer;
  thermoplastic resin;
  teflon coated release film; or
  thermoset resin.

8. The laminate of claim 1, wherein a second chemical composition of a second interfacial modifier of the plurality of interfacial modifiers is selected based on at least one of response of the second chemical composition to changes in temperature, the second chemical composition's thermal energy transference, the second chemical composition's optical properties, or the second chemical composition's electrical current conductivity.

9. The laminate of claim 1, further comprising a structural monitoring sensor between opposing faces of the first ply and the second ply, wherein the plurality of interfacial modifiers are arranged in the pattern to steer crack growth in the laminate towards the structural monitoring sensor.

10. The laminate of claim 1, further comprising a structural monitoring sensor between opposing faces of the first ply and the second ply, wherein the plurality of interfacial modifiers are arranged in the pattern to steer crack growth in the laminate away from the structural monitoring sensor.

11. The laminate of claim 1, further comprising:
  a third ply, wherein the second ply is interposed between the first ply and the third ply; and
  a second plurality of interfacial modifiers between opposing faces of the second ply and the third ply, wherein a chemical composition of an interfacial modifier of the second plurality of interfacial modifiers is selected based on a bond strength between the interfacial modifier of the second plurality of interfacial modifiers and at least one of the second ply or the third ply,
  wherein the second plurality of interfacial modifiers are arranged in a second pattern to selectively modify toughness of a portion of the laminate based on the bond strength of the interfacial modifier of the second plurality of interfacial modifiers.

12. The laminate of claim 9, wherein the chemical composition of the interfacial modifier of the second plurality of interfacial modifiers is different from the chemical composition of the interfacial modifier of the plurality of interfacial modifiers.

13. A method for forming a laminate comprising:
selecting a chemical composition for an interfacial modifier of a plurality of interfacial modifiers based on a resulting bond strength between the interfacial modifier of the plurality of interfacial modifiers and at least one of a first ply or a second ply of a laminate;
defining a pattern for placement of the plurality of interfacial modifiers between the first ply and the second ply, wherein the pattern is configured to selectively modify toughness of a portion of the laminate based on the bond strength of the interfacial modifier of the plurality of interfacial modifiers; and
placing the plurality of interfacial modifiers between opposing faces of the first ply and the second ply according to the pattern.

14. The method of claim 13, wherein the step of placing the plurality of interfacial modifiers comprises at least one of 3D printing, manual deposition, localized heating or light exposure, or placing cut films.

15. The method of claim 13, further comprising:
selecting a second chemical composition for a second interfacial modifier of the plurality of interfacial modifiers based on at least one of response of the second chemical composition to changes in temperature, the second chemical composition's thermal energy transference, the second chemical composition's optical properties, or the second chemical composition's electrical current conductivity.

16. The method of claim 13, further comprising:
selecting a chemical composition for an interfacial modifier of a second plurality of interfacial modifiers based on a bond strength between the interfacial modifier of the second plurality of interfacial modifiers and at least one of the second ply or a third ply of the laminate, wherein the second ply interposes the first ply and the third ply;
defining a second pattern for placement of the second plurality of interfacial modifiers between the second ply and the third ply, wherein the second pattern is configured to selectively modify toughness of a second portion of the laminate based on the bond strength of the interfacial modifier of the second plurality of interfacial modifiers, wherein the second pattern is different from the pattern; and
placing the second plurality of interfacial modifiers between opposing faces of the second ply and the third ply according to the second pattern.

17. The method of claim 13, wherein the chemical composition comprises at least one of:
polyvinyl alcohol;
polyvinyl butyral resin;
polyvinyl acetate;
polyvinyl amine copolymer;
thermoplastic resin;
teflon coated release film; or
thermoset resin.

18. A laminate comprising:
a first ply;
a second ply; and
a plurality of interfacial modifiers arranged between opposing faces of the first ply and the second ply, wherein a chemical composition of an interfacial modifier of the plurality of interfacial modifiers comprises at least one of polyvinyl alcohol, polyvinyl butyral resin, polyvinyl acetate, polyvinyl amine copolymer, thermoplastic resin, teflon coated release film, or thermoset resin,
wherein the plurality of interfacial modifiers are arranged in a pattern to selectively modify toughness of a portion of the laminate based on bond strength resulting from the chemical composition between the interfacial modifier of the plurality of interfacial modifiers and at least one of the first ply or the second ply.

19. The laminate of claim 18, wherein a second chemical composition of a second interfacial modifier of the plurality of interfacial modifiers is selected based on at least one of response of the second chemical composition to changes in temperature, the second chemical composition's thermal energy transference, the second chemical composition's optical properties, or the second chemical composition's electrical current conductivity.

20. The laminate of claim 18, wherein the bond strength is above a threshold amount to increase crack growth resistance of the portion laminate by selectively toughening the portion of the laminate.

* * * * *